United States Patent
Kawabata et al.

(10) Patent No.: US 6,642,681 B2
(45) Date of Patent: Nov. 4, 2003

(54) STARTING CONTROL METHOD OF AND CONTROL APPARATUS FOR SYNCHRONOUS MOTOR, AND AIR CONDITIONER, REFRIGERATOR, WASHING MACHINE AND VACUUM CLEANER EACH PROVIDED WITH THE CONTROL APPARATUS

(75) Inventors: Yukio Kawabata, Hitachinaka (JP); Tsunehiro Endo, Hitachiota (JP); Makoto Ishii, Utsunomiya (JP); Yuhachi Takakura, Oyama (JP); Toru Inoue, Ohira (JP)

(73) Assignee: Hitachi, Ltd., Tokyo (JP)

( * ) Notice: Subject to any disclaimer, the term of this patent is extended or adjusted under 35 U.S.C. 154(b) by 39 days.

(21) Appl. No.: 10/082,289

(22) Filed: Feb. 26, 2002

(65) Prior Publication Data

US 2002/0117989 A1 Aug. 29, 2002

(30) Foreign Application Priority Data

Feb. 26, 2001 (JP) .......................... 2001-049563

(51) Int. Cl.[7] .............................. H02P 6/20; H02P 6/18
(52) U.S. Cl. ....................................... 318/431; 318/439
(58) Field of Search ................................ 318/138, 254, 318/430, 431, 439, 720, 721, 722, 724

(56) References Cited

U.S. PATENT DOCUMENTS

| | | | | |
|---|---|---|---|---|
| 5,017,845 A | * | 5/1991 | Carobolante et al. | 318/138 |
| 5,298,838 A | * | 3/1994 | Peters et al. | 318/138 |
| 5,530,326 A | * | 6/1996 | Galvin et al. | 318/254 |
| 5,801,500 A | * | 9/1998 | Jensen et al. | 318/254 |
| 6,570,351 B2 | * | 5/2003 | Miyazaki et al. | 318/254 |

FOREIGN PATENT DOCUMENTS

JP 07-107777 4/1995

OTHER PUBLICATIONS

*Trans. IEEE of Japan*, vol. 105, No. 1/2, 1985, pp. 80–86 entitled "Brushless Motor without a Shaft–Mounted Position Sensor" by Tsunehiro Endo et al.

* cited by examiner

*Primary Examiner*—Bentsu Ro
(74) *Attorney, Agent, or Firm*—Crowell & Moring LLP (57) ABSTRACT

After the rotor position has been fixed prior to the start of a motor, the driving mode can be rapidly switched to sensorless driving and the motor can be started and controlled, by conducting current conversions in such a power supply pattern that increases the starting output torque of the motor, and controlling the inverter output voltage.

12 Claims, 8 Drawing Sheets

| | UPPER ARM | | |
|---|---|---|---|
| | U PHASE | V PHASE | W PHASE |
| LOWER ARM U PHASE | | $\frac{11}{12}\pi$ | $\frac{1}{6}\pi$ |
| LOWER ARM V PHASE | $\frac{5}{6}\pi$ | | $\frac{1}{2}\pi$ |
| LOWER ARM W PHASE | $\frac{7}{6}\pi$ | $\frac{3}{2}\pi$ | |

STARTING CONTROL METHOD OF AND CONTROL APPARATUS FOR SYNCHRONOUS MOTOR, AND AIR CONDITIONER, REFRIGERATOR, WASHING MACHINE AND VACUUM CLEANER EACH PROVIDED WITH THE CONTROL APPARATUS

BACKGROUND OF THE INVENTION

1. Field of the Invention

The present invention relates to a controller that controls the rotational speed of a synchronous motor to the desired speed, an air conditioner that provides room air conditioning by controlling its internal compressor/blower driving synchronous motor by use of the above-mentioned controller, a refrigerator that provides refrigeration by controlling its internal compressor/blower driving synchronous motor by use of the controller, a washing machine that washes clothes by controlling its pulsator/spin-dry tub driving synchronous motor by use of the controller, and a vacuum cleaner that cleans rooms by controlling its blower driving synchronous motor by use of the controller.

2. Description of Prior Art

Because of their ease in maintenance, brushless direct-current (DC) motors each having a permanent magnet rotor and a stator coil assembly, are used in air conditioners, refrigerators, washing machines, and the like. Brushless DC motor driving control requires close linking between the magnetic pole position of the rotor and the positions of the stator coils which need to be energized. The motors for driving the compressors of air conditioners or of other electrical appliances use the sensorless position detection scheme, in which the magnetic pole position of the rotor is detected using the counter-electromotive force induced into the stator coils by their interactions with the magnetic pole of the rotor, not using a rotor position detection sensor such as a Hall element.

However, since the counter-electromotive force mentioned above is induced into the stator coils by the rotation of the rotor, when the motor is in a stopped status, the magnetic pole position of the rotor cannot be detected with the corresponding method. For this reason, used in prior art is the so-called low-frequency starting method, in which the position of the rotor is first made firm by energizing the stator coils of the two required phases during motor start, then after current conversion has been started and the current conversion time interval has been reduced in steps by synchronous operation to enable sensorless position detection with the counter-electromotive force, the driving mode is switched to driving based on sensorless position detection. The corresponding current conversion time interval and the voltage applied at this time are determined by the timing and value preset from the control unit.

The prior art for converting current, independently of the rotor position, by changing the voltage to be applied during motor start and then transmitting a current conversion signal to all phases of the stator coils in the timing that the current conversion time interval is to be forcibly given using the voltage at which the electrical quantities of non-energized phases change, is set forth in Japanese Application Patent Laid-Open Publication No. Hei 07-107777.

SUMMARY OF THE INVENTION

If the starting load torque is always kept constant, although the motor can be started in the preset voltage and timing, the starting load torque is usually unknown in the case of the motors for use in compressors and in washing machines. Therefore, when the starting current conversion time interval is too short and the starting voltage to be applied is too low, although the motor can be started if the load torque is small enough, it may not be possible for the motor to be started if the load torque is too large, since the motor may be insufficient in output torque.

Conversely, when the starting current conversion time interval is long enough and the starting voltage to be applied is high enough, although the motor can be started even if the load torque is too large, in the event that the load torque is too small, this will increase the motor current too significantly, thus easily generating an eddy current and, in the worst case, damaging the inverter module and the motor. In short, under the low-frequency starting method based on prior art, since current conversion independent of the rotor position occurs during synchronous operation, the motor is difficult to start properly, if the load torque is unknown.

In addition, in the case of the prior art, since current conversion independent of the rotor position occurs during synchronous operation, if the starting load changes significantly, the relationship between the position of the rotor and the cycle time of the load changes may not enable the motor to be started. Furthermore, during synchronous operation, since current conversion independent of the rotor position occurs, the possible significant changes in the output torque of the motor may cause significant vibration of the frame in which the motor is enclosed. Under the prior art, since current conversion independent of the rotor position occurs during synchronous operation, the motor characteristics cannot be utilized sufficiently and the motor is difficult to apply to products in which the motor speed needs to be increased rapidly.

An object of the present invention is to supply a synchronous-motor starting method and control apparatus that enable a synchronous motor to be started reliably and rapidly, even if its starting load torque is unknown.

Another object of the present invention is to supply a synchronous-motor starting method and control apparatus that enable a current to be converted rapidly according to the particular position of the rotor.

A yet another object of the present invention is to supply a synchronous-motor starting method and control apparatus that enable a synchronous motor to be started properly, even if its starting load torque changes.

A yet another object of the present invention is to supply a synchronous-motor starting method and control apparatus that minimizes any changes in the starting output torque of a synchronous motor and thus suppresses the vibration of the frame in which the motor is enclosed.

A yet another object of the present invention is to supply a synchronous-motor starting method and control apparatus that enable the rotational speed of a synchronous motor to be increased rapidly during its startup.

A yet another object of the present invention is to supply a synchronous-motor starting method and control apparatus that minimizes any decreases in motor current due to the counter-electromotive force generated during the rotation of the motor and thus prevents the insufficiency of its starting output torque.

A yet another object of the present invention is to supply a synchronous-motor starting method and control apparatus that enable a synchronous motor to be started with high efficiency by suppressing the motor current according to the starting load torque and reducing the load on the output circuit.

A yet another object of the present invention is to supply electrical appliances powered from the controlled synchronous motor mentioned above, especially, an air conditioner, a refrigerator, a washing machine, and a vacuum cleaner.

The start of a synchronous motor according to the present invention is accomplished by providing a first power supply pattern, a second power supply pattern, and a third power supply pattern as three successive startup power supply patterns, then after maintaining the respective power supply periods T1, T2, and T3 of the three power supply patterns in the relationship of T1>T3≧T2≧0, converting a current in the power supply pattern that enables the output torque of the synchronous motor to be increased when it is started.

The control apparatus for a synchronous motor, based on the present invention, has a position detection circuit for comparing the terminal voltage of the motor and a reference voltage and generating a rotor position detection signal, and detects rotor position information in the third power supply period T3 mentioned above.

The control apparatus for a synchronous motor, based on the present invention, has a timer for counting the time from the above-mentioned second current conversion or the above-mentioned third current conversion to the above-mentioned rotor position detection in the above-mentioned third power supply period T3, and a timer for counting the time from the above-mentioned position detection to the next current conversion.

The start of a synchronous motor according to the present invention is accomplished by measuring the time from the above-mentioned second current conversion or the above-mentioned third current conversion to the above-mentioned rotor position detection in the above-mentioned third power supply period T3, and determining the time to the next current conversion, based on the measured time.

The control apparatus for a synchronous motor, based on the present invention, has a function that increases the inverter output voltage in steps in the above-mentioned third power supply period T3.

The start of a synchronous motor according to the present invention is accomplished by increasing the inverter output voltage in the above-mentioned third power supply period T3 until the required motor speed has been reached or exceeded.

During the start of a synchronous motor according to the present invention, adjustment of the motor current according to the particular magnitude of the starting load torque is accomplished by setting the inverter output voltage beforehand.

During the start of a synchronous motor according to the present invention, the rotational speed of the motor and the position of its rotor are estimated from the angular acceleration of the motor and the inverter output voltage is controlled in each power supply period.

DESCRIPTION OF EMBODIMENTS OF THE INVENTION

Embodiments of the brushless DC motor control apparatus pertaining to the present invention, and of electrical appliances using brushless DC motors driven by the corresponding control apparatus, are described below, referring to FIGS. 1 to 11.

Figure 1:
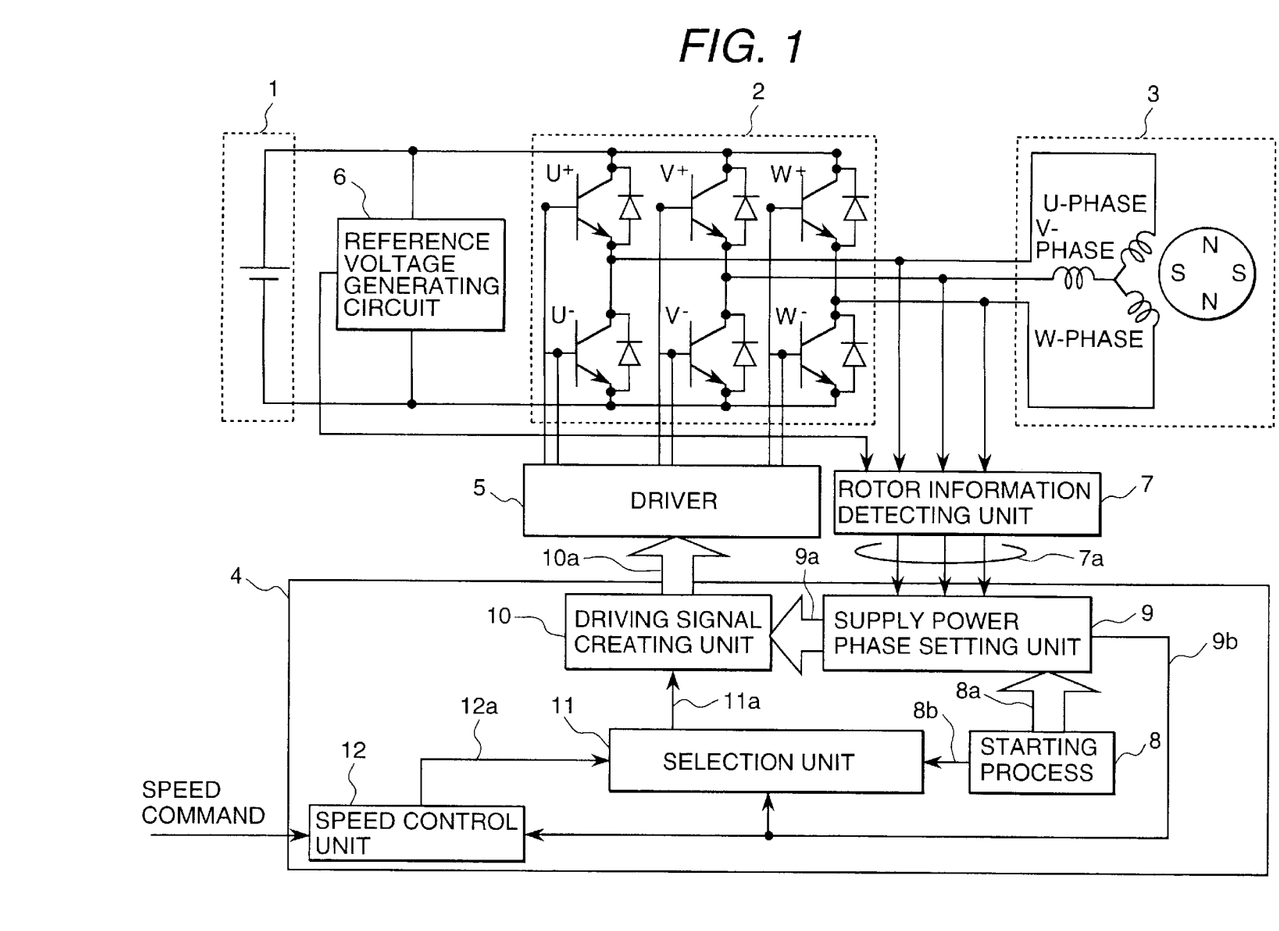
FIG. 1 is a block diagram showing an embodiment of a brushless DC motor control apparatus based on the present invention.

FIG. 1 is a block diagram showing an embodiment of the brushless DC motor control apparatus pertaining to the present invention. This brushless DC motor control apparatus has an inverter circuit 2 which rotates a synchronous motor 3 by converting the voltage of a DC power supply 1 into an AC voltage of any pulse width and supplying the AC voltage to the stator coils of the above-mentioned synchronous motor 3, a control circuit (one-chip microcomputer or hybrid IC) 4 which controls synchronous motor 3 according to speed command signal, a driver 5 which drives the aforementioned inverter circuit 2 in accordance with the above-mentioned control circuit 4, and a rotor information detection unit 7 which compares the terminal voltage of each phase assigned to the stator coils of synchronous motor 3, namely, counter-electromotive force, and the reference voltage that has been generated by a reference voltage generating circuit 6, and detects the magnetic pole position of the rotor of synchronous motor 3 by use of the reference voltage information.

In the present embodiment, a voltage half the DC supply voltage is generated as a reference voltage by reference voltage generating circuit 6, and then the position of the rotor is detected by rotor information detection unit 7 by comparing the reference voltage and the terminal voltage of the motor. The reference voltage, although half the DC voltage in the present embodiment, can be, for example, a virtual neutral-point voltage generated from the motor terminal voltage.

Control circuit 4 comprises a starting unit 8 which starts synchronous motor 3 from its stopped status, a power supply phase setting unit 9 which determines the power supply phase from the output signal 8a of the starting unit 8 and the rotor information output signal of the rotor information detection unit 7, a driving signal generating unit 10 which generates a driving signal 10a from a power supply phase signal 9a and the output signal 11a of a selection unit 11, selection unit 11 which selects either the inverter output voltage information 8b transmitted from starting unit 8 or the inverter output voltage information 12a transmitted from a speed control unit 12, depending on the present motor speed signal 9b given from power supply phase setting unit 9, and speed control unit 12 which creates inverter output voltage information 12a from the assigned speed command signal and present motor speed signal 9b.

In addition to transmitting to power supply phase setting unit 9 the signal 8a relating to the phases of the stator coils to be energized in accordance with a starting command, starting unit 8 transmits inverter output voltage information 8b to selection unit 11.

Power supply phase setting unit 9 first acquires power supply phase information from the above-mentioned signal 8a relating to the phases of the stator coils to be energized, and a rotor information signal 7a from rotor information detection unit 7, then transmits power supply phase signal 9a, and transmits the present motor speed signal 9b as well.

Driving signal generating unit 10 generates a driving signal 10a from power supply phase signal 9a and inverter output voltage information 11a, and transmits the driving signal.

Selection unit 11, after receiving the present motor speed signal 9b from power supply phase setting unit 9, judges and selects whether the inverter output voltage information 8b from starting unit 8 or the inverter output voltage information 12a from speed control unit 12 is to be transmitted.

The driving method in the present embodiment is 120-degree power-on driving.

The operation of each system component outlined above is described in further detail below.

Figure 2:
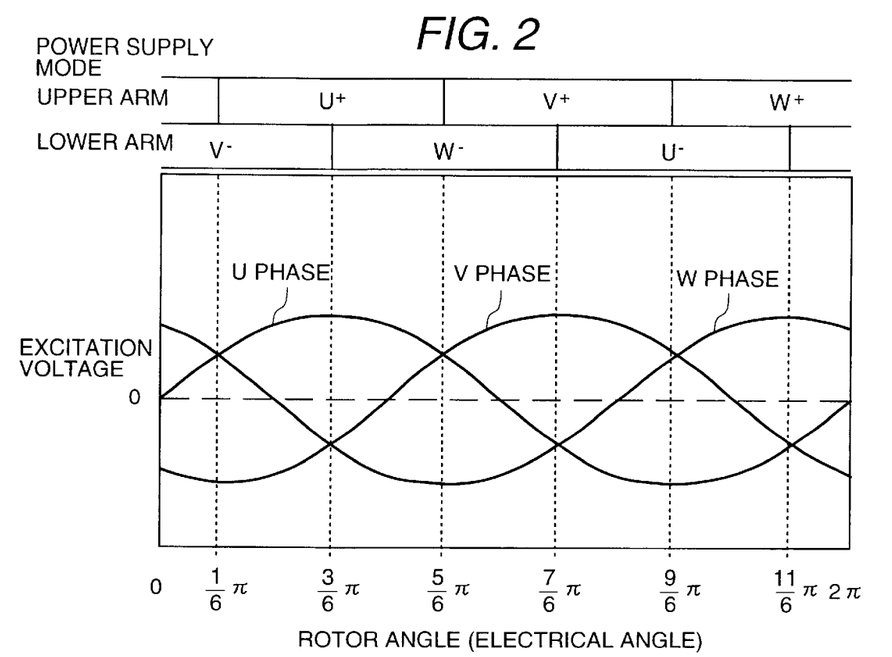
FIG. 2 is an epitomic diagram showing an example of the angle differential values of magnetic fluxes with respect to the rotor angles of the brushless DC motor used in an embodiment of the present invention, and an example of 120-degree power supply modes.
Figure 3:
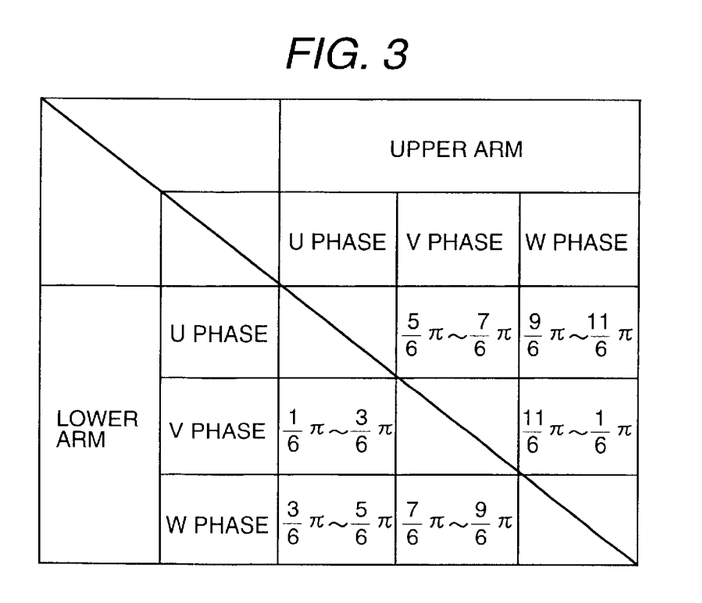
FIG. 3 is a diagram showing the rotor angles and power supply modes of the brushless DC motor during 120-degree power-on driving in an embodiment of the present invention.

The relationship between the induced voltage and rotor angle of the brushless DC motor used in the present embodiment, and the power supply modes applies during general 120-degree power-on driving are schematically shown in FIG. 2. During 120-degree power-on driving, one of six power supply modes is selected for each electrical angle as shown in FIG. 2. Rotor angles with respect to each power supply mode are shown in FIG. 3.

Figure 4:
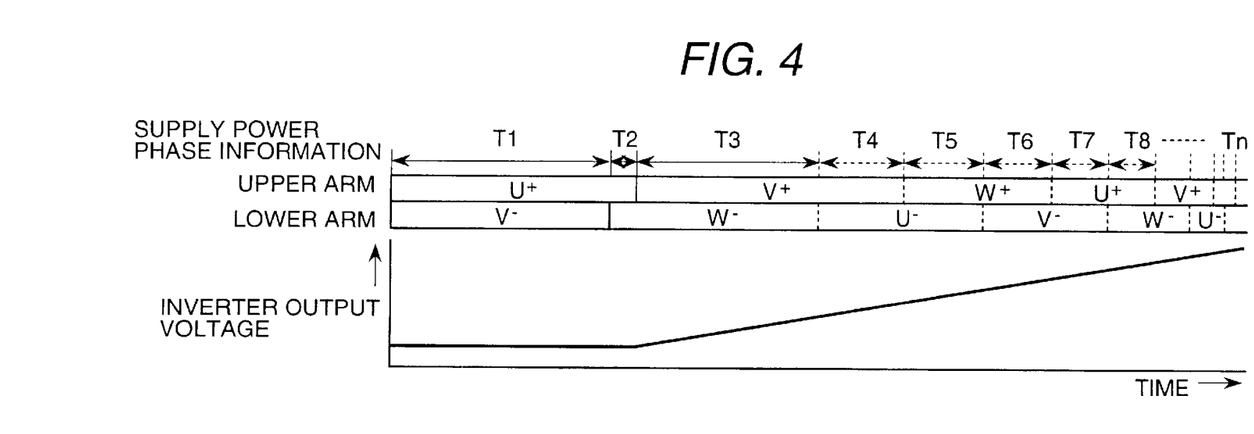
FIG. 4 is a diagram showing an example of a power supply pattern and inverter output voltage changes, based on the present invention.

FIG. 4 shows an example of output of power supply phase signal 8a and inverter output voltage information 8b from starting unit 8. The power supply pattern indicated by power supply phase signal 8a, and the inverter output voltage are described in sequence below using FIG. 4.

In the power supply pattern of the present embodiment, after the position of the rotor has almost been fixed by energizing two phases during the first power supply period T1, the current is converted during the second power supply period T2 first and then the third power supply period T3 and the span of time between the three power supply periods is maintained in the relationship of T1>T3≧T2≧0, under which the dotted line denoting each power supply time interval after T3 is determined in accordance with rotor information signal 7a. Although, in the present embodiment, power supply period T1 is a bi-phase power supply period, it is possible to conduct tri-phase power-on in power supply period T1, then almost fix the rotor to any position, and convert the current according to the particular position of the rotor.

Figure 5:
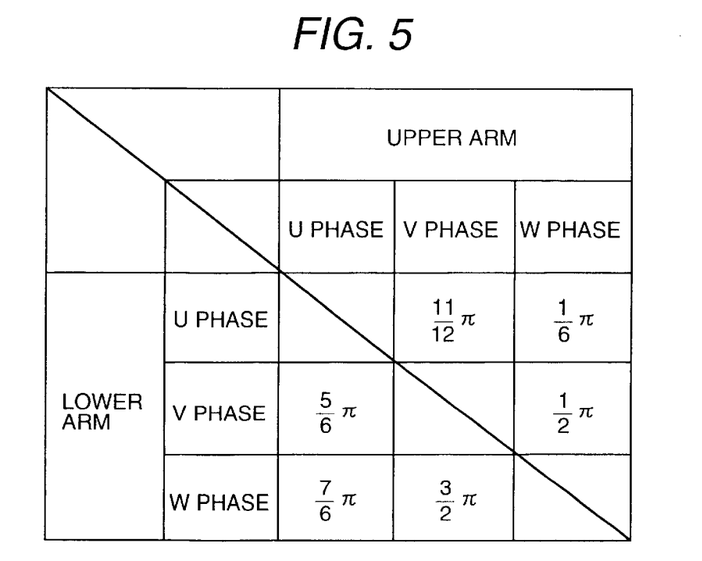
FIG. 5 is a diagram showing the power supply mode and rotor fixing position of the brushless DC motor used in an embodiment of the present invention.

FIG. 5 is a table representing the position of the rotor almost fixed in each power supply mode when bi-phase power-on is continued without any power supply phases being selected.

When the U-phase of the upper arm (hereinafter, this phase is abbreviated to U+) and the V-phase of the lower arm (likewise, this phase is abbreviated to V−) are energized in power supply period T1 as shown in FIG. 4, it can be seen from FIG. 5 that the rotor is fixed to a position of $\frac{5}{6}\pi$. The power supply mode in which a large motor output torque can be obtained at this rotor position is, as shown in FIG. 3, either a combination of U+ and W− (W-phase of the lower arm) or a combination of V+ (V-phase of the upper arm) and W−. At this time, since the rotor position in the U+, W− mode corresponds to the end of the corresponding power supply period, it is possible to set T=0 by omitting this mode and then supply power directly in the V+, W− mode. In this case, however, since a continuous motor current cannot be obtained, a power supply pattern in which, as shown in FIG. 4, power is to be supplied only during the period of T2 in the U+, W− mode and then the current is to be converted during power supply period T3 in the V+, W− mode, is employed in the present embodiment.

In the power supply pattern of prior art, during the period of T1, after the rotor position has been fixed, current conversion occurs in a continuous power supply mode and at the same time, the current conversion time interval is reduced in steps so that T1>T2>T3 is established. The power supply pattern in the present embodiment, however, differs from the above pattern in that as shown in FIG. 4, current conversion occurs in the power supply mode of T3 after power has been supplied only during a short period of T2. In the present embodiment, T2=0 can also be applied to the power supply pattern of FIG. 4.

It is possible, by conducting current conversions in the power supply pattern described above, to increase the starting output torque of the motor by making effective use of the motor characteristics from the conversion immediately succeeding the positioning of the rotor, and thus to increase the motor speed rapidly. Consequently, rotor information can be early detected using counter-electromotive force. After the rotor information has been detected, the appropriate power supply mode is selected on the basis of the information.

In the present embodiment, the power supply time intervals after the period of T3 in FIG. 4 do not always need to follow rotor information signal 7a. Instead, power can be supplied, independently of the rotor position, to allow for disturbance such as noise, and to ensure that, for example, T3>T4>T5 is established.

As shown in FIG. 4, the inverter output voltage is the value needed to fix the rotor position during the first power supply period T1, and this voltage value gradually increases in and after the third power supply period T3. In this way, under the present embodiment, the inverter output voltage is varied within one power supply period. In the present embodiment, although the voltage in the first power supply period T1 is constant, this voltage can be varied, provided that the rotor position can be fixed. Also, in the present embodiment, although the inverter output voltage is gradually increased in and after the third power supply period T3, this voltage value can be gradually increased in and after the second power supply period T2.

After the rotor position has been fixed, when the current is converted and the motor start rotating, counter-electromotive force is generated. Since the magnitude of the counter-electromotive force changes according to the motor speed and the rotor position, the start of the motor with the inverter output voltage kept constant reduces the motor current with increases in the counter-electromotive force, thus reducing the motor output torque as well. In the present embodiment, in order to prevent the motor current from decreasing with the motor speed, the inverter output voltage can be gradually increased in and after the second power supply period T2.

The inverter output voltage is increased so that even when motor rotation is started by current conversion from the first power supply period T1 to the second power supply period T2, an almost constant motor output torque based on the counter-electromotive force constant and torque constant of the motor and on the basis of the motor current generated during the current conversion from the first power supply period T1 to the second power supply period T2, can be obtained at the maximum desired starting load torque. Hereby, an almost constant motor output torque can be achieved. Details are described below.

The operation of the motor that includes a mechanical transient phenomenon can be represented using equation-of-motion (1) below.

$$\tau m - \tau L = J(d\omega m/dt) \qquad (1)$$

where τm, τL, J, and ωm denote the output torque, load torque, total inertial moment, and rotation speed, respectively, of the motor.

Since the motor current generated during the above-mentioned current conversion from the first power supply period T1 to the second power supply period T2 is almost the same as the motor current generated immediately before the current is converted during power supply period T2, the output torque generated during the current conversion from the first power supply period T1 to the second power supply period T2 can be calculated from that current value and the torque constant of the motor. Therefore, the angular acceleration (dωm/dt) during the current conversion from the first power supply period T1 to the second power supply period T2 can be calculated. Also, if the angular acceleration (dωm/dt) is constant, the motor speed and rotor position at the particular time can be derived.

In the present embodiment, after the angular acceleration (dωm/dt) during the current conversion from the first power supply period T1 to the second power supply period T2 has been calculated with L as the maximum desired starting load torque, the counter-electromotive force generated in each phase is calculated from the motor speed and rotor angle detected at the particular time and then a voltage equivalent to the counter-electromotive force generated between two phases in 120-degree power-on is added to the inverter output voltage corresponding to the end of the power supply period T1. Thus, the inverter output voltage shown in FIG. 4 is set. That is to say, the inverter output voltage in the present embodiment of FIG. 4 is set so that the motor can be started at the maximum desired load torque with both the motor current and the motor output torque kept almost constant.

Figure 6:
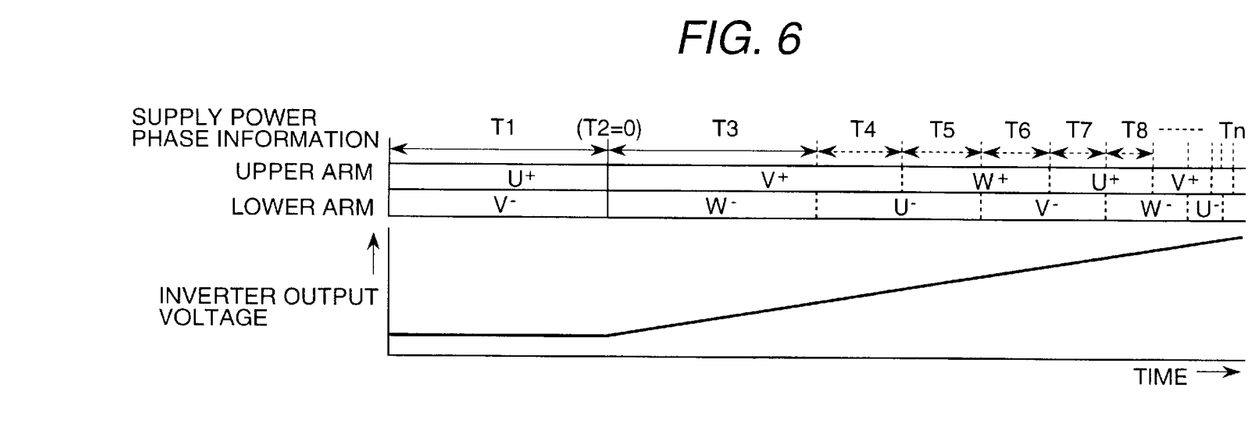
FIG. 6 is a diagram showing another example of a power supply pattern and inverter output voltage changes, based on the present invention.

FIG. 6 shows another embodiment relating to the power supply pattern and inverter output voltage. In this embodiment, the power supply period (U+, W− mode) corresponding to T2 in FIG. 4 is set to zero since power supply period T1 is immediately followed by the V+, W− mode. More specifically, the above-mentioned power supply period is set so that the motor can be started at the maximum desired load torque with both the motor current and the motor output torque kept almost constant.

Next, the operation of power supply phase setting unit 9 is described. When the motor is started, power supply phase signal 9a for implementing the power supply mode of power supply period T1 in FIG. 3 is transmitted from power supply phase setting unit 9, pursuant to power supply phase information 8a from starting unit 8. After that, power supply phase signals 9a for implementing the power supply modes of power supply periods T2 and T3 are transmitted similarly. At this time, the position of the rotor is detected in accordance with the rotor information signal 7a that has been obtained by rotor information detection unit 7 during the power supply mode of power supply period T3, and after the elapse of a delay time equivalent to ⅙π, power supply phase signal 9a for converting the current during the power supply mode of power supply period T4 is transmitted. After this, power supply phase signals 9a for repeating the current conversion are transmitted in sequence in accordance with the rotor information signals 7a that have been obtained by rotor information detection unit 7 similarly to the above statement. Also, the present rotor speed is calculated from the time either the output signal 7a of rotor information detection unit 7 or power supply phase signal 9a changes.

Figure 7:
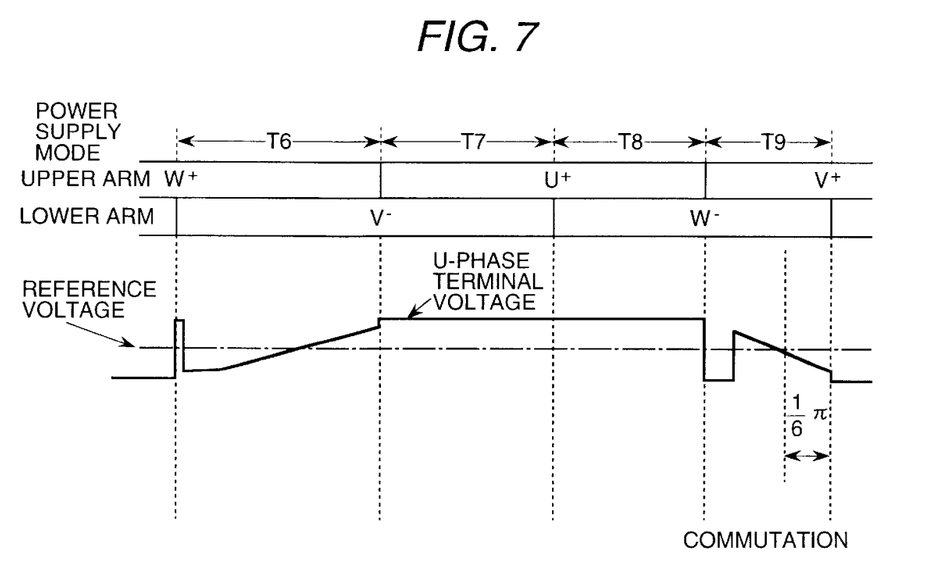
FIG. 7 is a diagram showing the relationship between power supply mode, reference voltage, and terminal voltage.

The relationship between the detection of the rotor position by the rotor information detection unit of the present embodiment, and power supply mode, is schematically shown in FIG. 7. The rotor position detected by rotor information detection unit 9 in the present embodiment is based on comparison between the terminal voltage and a reference voltage, as shown in FIG. 7, and the detected rotor position corresponds to the timing immediately preceding ⅙π at which the current conversion during the next power supply mode takes place. Accordingly, to implement power supply mode selection in the timing of FIG. 7, a delay time equivalent to ⅙π needs to be set. In the present embodiment, the delay time from completion of rotor position detection during power supply period T3 to the start of a change to power supply period T4 is set as follows:

In the present embodiment, after the rotor position has been fixed during power supply period T1, since the current is converted and the rotor position that has been detected during power supply period T3 is determined, the amount of displacement from the fixed rotor position to the detected rotor position is also determined. Therefore, angular acceleration is calculated from the above-mentioned amount of displacement and the time from the start of the T2 power supply mode to the detection of the rotor position within power supply period T3, then a time equivalent to the amount of displacement up to the next current conversion (here, the amount of displacement is ⅙π) is calculated using the above angular acceleration, and the calculated time is set as the delay time from the detection of the rotor position to the next conversion of current. Although, in the present embodiment, a delay time equivalent to ⅙π is set in order to achieve the timing of such power supply mode as shown in FIG. 7, it is desirable that the amount of displacement up to the next current conversion (namely, the delay time) should be set according to the particular characteristics of the motor.

Figure 8:
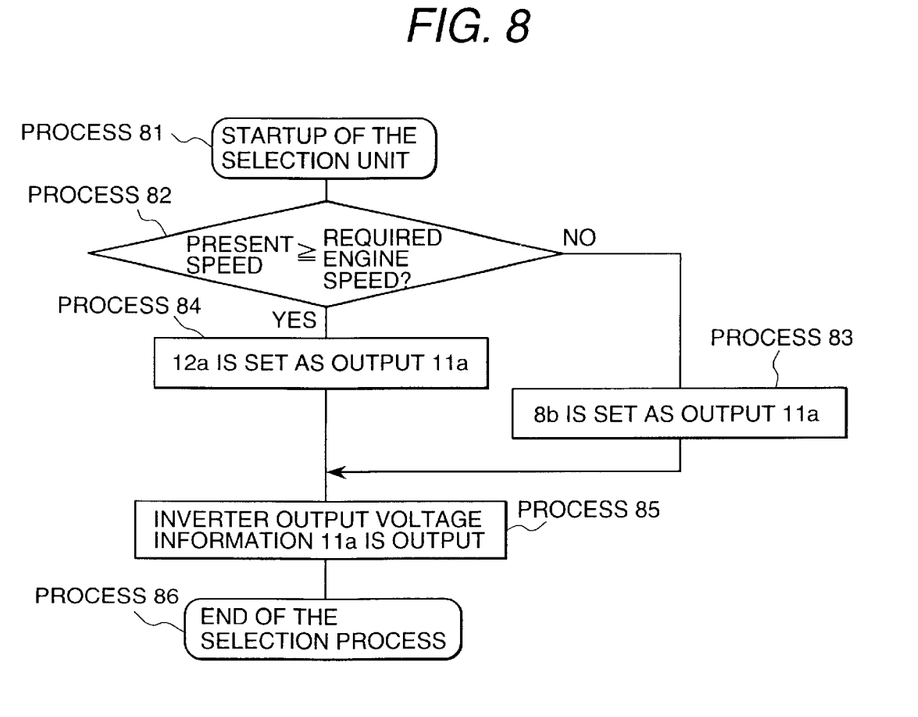
FIG. 8 is a flowchart of the operation sequence performed by the selection unit in the brushless DC motor control apparatus of FIG. 1 according to the present invention.

FIG. 8 is a flowchart of selection unit 11. In selection unit 11, until the starting present motor speed 9b reaches the preset value, inverter output voltage information 8b from starting unit 8 will be transmitted as output signal 11a, and when the required motor speed is reached or exceeded, output signal 11a will be changed to the inverter output voltage information 12a from speed control unit 12 preadjusted so as to match the present motor speed 9b to the specified speed, and the inverter output voltage information will be transmitted from selection unit 11. That is to say, first, inverter output voltage information 8b from starting unit 8 is transmitted as output signal 11a until the starting present motor speed 9b has reached the preset value, then the inverter output voltage within the power supply period is increased, and the rotational speed of the rotor is rapidly increased. After this, the starting kinetic energy of the rotor is increased rapidly and yield strength against changes in starting load and against abrupt changes in load torque is improved.

Figure 9:
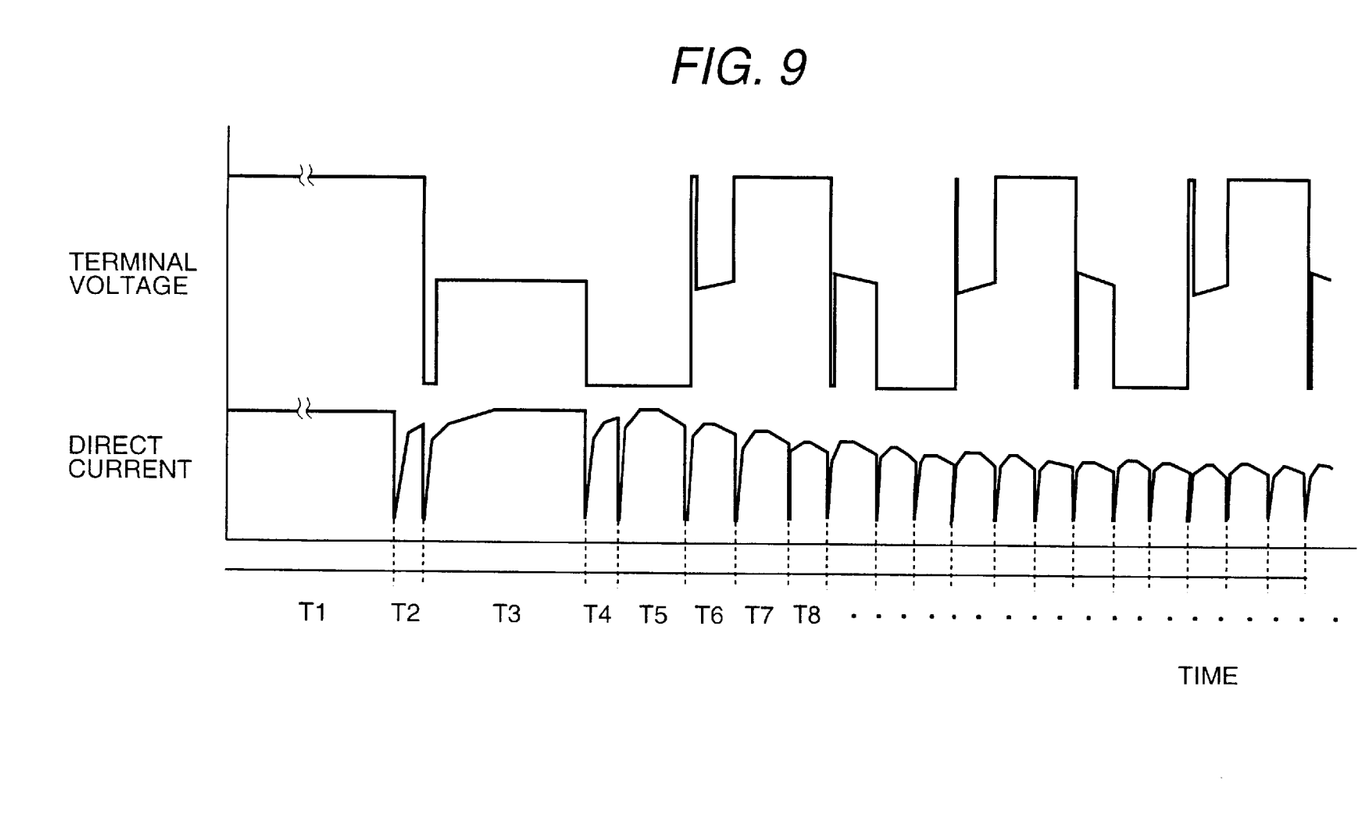
FIG. 9 is a diagram showing an example of the starting terminal voltage waveform and DC current waveform created by the brushless DC motor pertaining to the present invention.

FIG. 9 is a startup operation signal waveform diagram of the present embodiment. Results on startup using the power supply pattern of FIG. 4 under the maximum desired starting load torque conditions are shown in FIG. 9. In FIG. 9, in order from top, each waveform denotes the V-phase terminal voltage and DC current of the motor.

Figure 10:
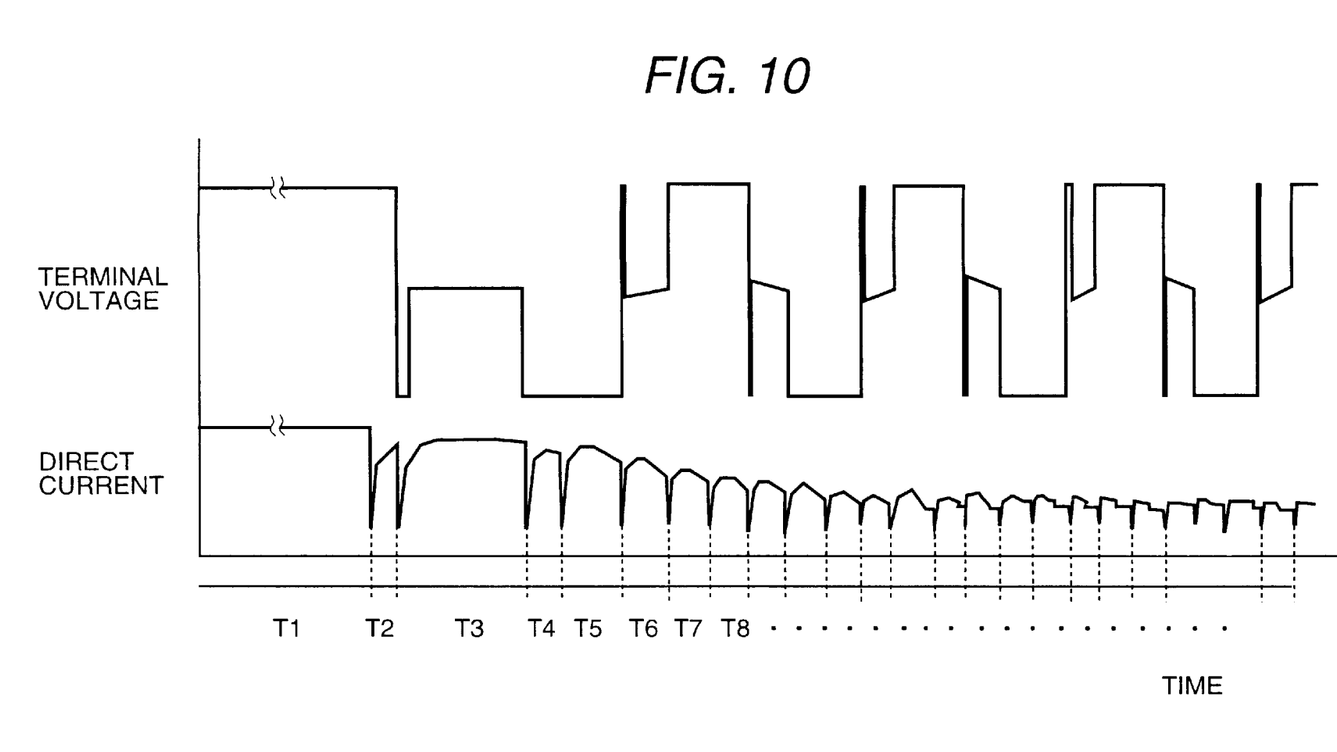
FIG. 10 is a diagram showing another example of the starting terminal voltage waveform and DC current waveform created by the brushless DC motor pertaining to the present invention.

As shown in FIG. 9, the motor can be started in power supply period T3 without a decrease in current. Also, FIG. 10 is another startup operation signal waveform diagram of the present embodiment, and this diagram applies to the case that the settings of the power supply pattern and inverter output voltage are the same as in FIG. 9 and the load torque is smaller than the maximum desired starting load torque. When the motor is started at a smaller load torque than the maximum desired starting load torque by use of the same power supply pattern and inverter output voltage as those of FIG. 9, since the motor speed increases above that of FIG. 9, the counter-electromotive force increases and the motor current decreases. The fact that the motor speed increases above that of FIG. 9, however, means that the motor can be started. This fact, in turn, means that the use of the motor starting method employed in the present invention enables not only the motor to be reliably started at the maximum desired starting load torque or less, but also the motor current to be controlled according to the particular magnitude of the starting load torque. At this time, since current conversion according to the rotor position takes place using rotor position information, changes in the output torque of the motor can be minimized and the vibration of the motor enclosure due to changes in the motor output torque can also be reduced.

Figure 11:
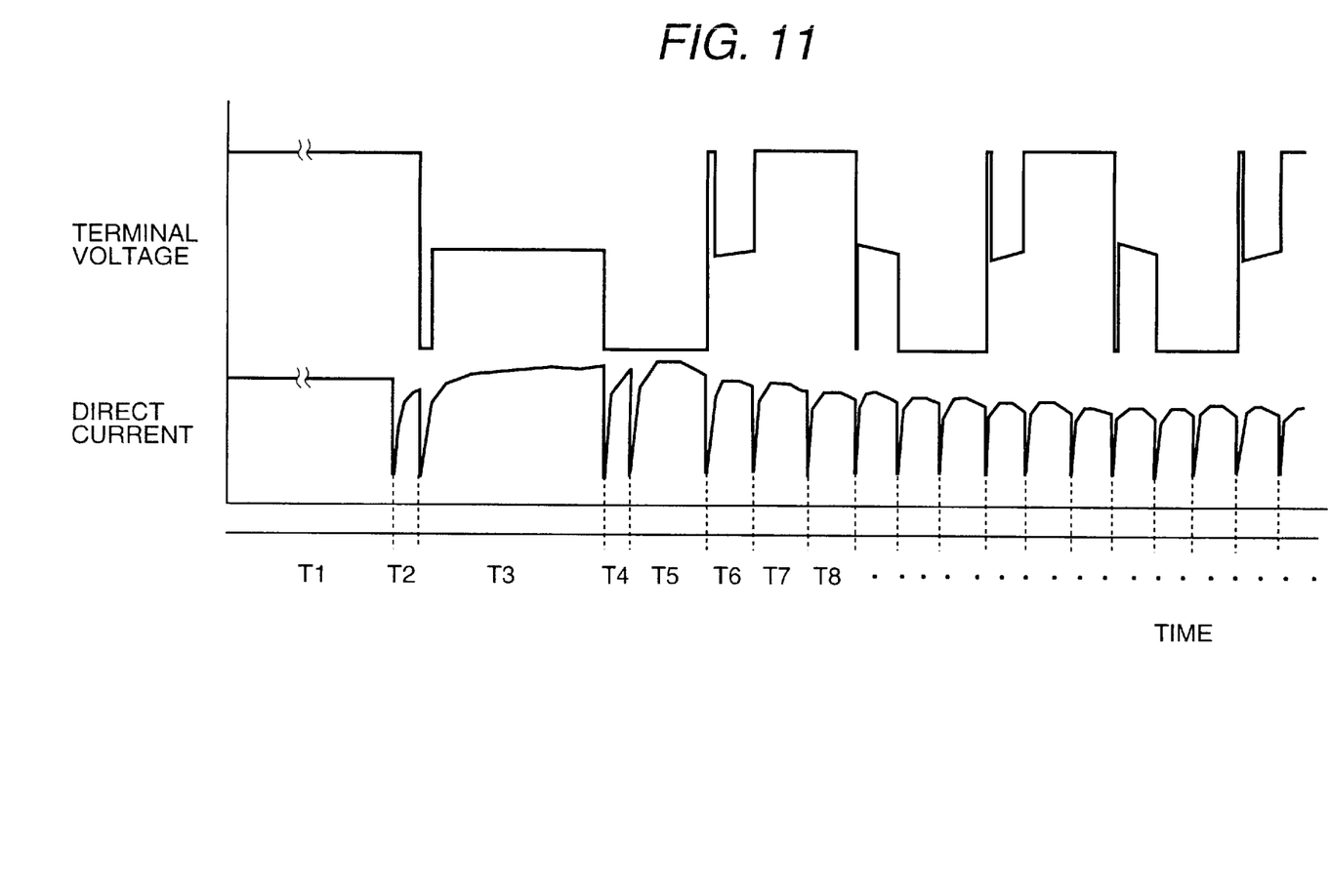
FIG. 11 is a diagram showing yet another example of the starting terminal voltage waveform and DC current waveform created by the brushless DC motor pertaining to the present invention.

FIG. 11 is yet another startup operation signal waveform diagram of the present embodiment, and this diagram applies to the case that the load torque is set to 1.5 times the maximum desired starting load torque at the same power supply pattern and inverter output voltage as those of FIG. 9. When the motor is started at a smaller load torque than the maximum desired starting load torque by use of the same power supply pattern and inverter output voltage as those of FIG. 9, since the motor speed decreases below that of FIG. 9, the counter-electromotive force decreases and the motor current increases. This increase in the motor current increases the motor output torque, enabling the motor to be started.

Under the motor starting method of the present invention, when the maximum desired starting load torque and the actual load torque of the motor match, the motor is started while the motor current during rotor positioning is almost maintained. When the load torque is small, since an actual angular acceleration increases above its assumed value, actual counter-electromotive force also increases above its estimated value and as a result, the motor can be started with the motor current being controlled. At this time, the counter-electromotive force increases and this, in turn, stabilizes rotor information detection. Furthermore, when the starting load torque is greater than the maximum desired starting load torque, since an actual angular acceleration is smaller than its assumed value, the counter-electromotive force decreases and this increases the motor current, with the result that since the motor output torque also increases, the starting output torque range of the motor can be extended unless the permissible current range of the inverter module are overstepped.

According to the present embodiment, therefore, it is possible to avoid the insufficiency of torque, associated with increases in counter-electromotive force, and obtain the necessary motor output torque and to determine the magnitude of the motor current according to the particular magnitude of the load torque. As a result, reliable and highly efficient motor starting can be realized. Although 120-degree power-on driving is employed in the present embodiment, similar effects can also be obtained using a wide-angle power-on driving method (a driving method having a power supply time interval greater than 120 degrees), only if this method is a motor control method in which driving can be executed by selecting power supply phases.

The synchronous motor control apparatus according to the present invention is used for a control apparatus of a synchronous motor driving a compressor compressing a cooling medium of an air conditioner, a control apparatus of a synchronous motor driving an air blower of an internal apparatus of the air conditioner, and/or a control apparatus of a synchronous motor driving an air blower of an external apparatus of the air conditioner.

Particularly, when the synchronous motor control apparatus using the synchronous-motor starting method of the present invention is applied to a synchronous motor of a driving source for a compressor of an air conditioner, the motor can be started very efficiently because the motor start itself is reliable and because the motor current is controlled according to load torque. Since motor pulsations in terms of starting motor output torque can be reduced, a highly efficient air conditioner almost free from startup vibration can also be realized.

In addition, since air conditioners of the heat pump type change in output according to the particular rotational speed of the compressor, when the motor control apparatus using the motor starting method of the present invention is applied for a control apparatus of a synchronous motor of a driving source for a compressor, a high-performance air conditioner can be realized because control according to rotor position can be implemented from the start of the motor and because the rotational speed of the motor can be rapidly increased by making full use of the motor characteristics.

Similarly, when the motor control apparatus using the synchronous-motor starting method of the present invention is used for a control apparatus of a synchronous motor of a driving source of a refrigerator or a compressor compressing a cooling medium of the refrigerator, the synchronous motor can be started very efficiently because the motor start itself is reliable and because the motor current is controlled according to load torque. Since motor pulsations in terms of starting motor output torque can be reduced, a refrigerator almost free from startup vibration can also be realized. In addition, it is possible to realize a high-performance refrigerator whose motor starting speed can be rapidly increased.

Also, when the motor control apparatus using the synchronous-motor starting method of the present invention is used for a control apparatus of a synchronous motor of a driving source for stirring blades installed inside a washing tub of a washing machine or for a control apparatus of a synchronous motor of a driving source of a dewatering tub, the motor can be started very efficiently because the motor start from a high-load status is reliable even in the case of sensorless driving and because the motor current is controlled according to load torque. For this reason, sensorless driving can be achieved, even in a washing machine driven by a sensor-equipped motor. In addition, it is possible to realize a high-performance washing machine whose spin-dry motor starting speed can be rapidly increased.

Besides, when the synchronous motor control apparatus using the synchronous-motor starting method of the present invention is used as a control apparatus of a synchronous motor of a driving source for a motor-driven suction blower of an electric vacuum cleaner, since the motor start itself is reliable and since motor driving can be rapidly switched from the start of the motor start to sensorless driving, an electric vacuum cleaner whose motor starting speed can be rapidly increased can be realized.

When the motor control apparatus using the synchronous-motor starting method of the present invention is applied as a driving source, an electrical appliance that starts operating very efficiency, with minimum vibration, and rapidly can be realized.

According to the present invention, reliable and rapid motor starting is possible, even when the starting load torque of the motor is unknown. Highly efficient motor starting is also possible since the motor current can be controlled according to the particular starting load torque of the motor. In addition, the insufficiency of starting output torque can be avoided by minimizing decreases in motor current due to the counter-electromotive force generated during motor rotation. Furthermore, current conversion according to rotor position can be started immediately after the start of the motor, and thus the motor itself can be started with minimum vibration. Besides, since current conversion according to rotor position can be started immediately after the start of the motor, rapid motor starting can be implemented by utilizing the motor characteristics. High-quality air conditioners, refrigerators, washing machines, vacuum cleaners, and other electrical appliances can be realized by applying as their driving sources the motor control apparatus which uses the motor starting method of the present invention.

What is claimed is:

1. A synchronous-motor starting method using an inverter which has a direct-current power supply and a power output means for supplying stator coils of multiple phases with power based on a direct-current voltage, and is designed to change power supply phases and drive a synchronous motor, wherein the synchronous-motor starting method is characterized in that a first power supply pattern, a second power supply pattern, and a third power supply pattern are provided as three successive startup power supply patterns, and in that when the power supply period corresponding to said first power supply pattern, the power supply period corresponding to said second power supply pattern, and the power supply period corresponding to said third power supply pattern are taken as T1, T2, and T3, respectively, these periods are maintained in the relationship of $T1>T3 \geq T2 \geq 0$.

2. The synchronous-motor starting method set forth in claim 1 above, wherein the synchronous-motor starting method is characterized in that said inverter has a position detection circuit for comparing a motor terminal voltage and a reference voltage and generating a rotor position detection signal, in that during said first power supply period T1, the inverter supplies power to the stator coil of a specific phase and positions the rotor of said motor, and in that either during or after said third power supply period T3, the inverter detects the rotor position detection signal transmitted from said position detection circuit.

3. The synchronous-motor starting method set forth in claim 2 above, wherein the synchronous-motor starting method is characterized in that the time from the start of current conversion to either said second power supply period T2 or said third power supply period T3, to the detection of said rotor position in the third power supply period T3, is measured and in that the delay time to the next current conversion is determined from the measured time.

4. The synchronous-motor starting method set forth in claim 3 above, wherein the synchronous-motor starting method is characterized in that the inverter output voltage in said first power supply period T1 is constant and in that the inverter output voltage is changed in said second power supply period T2 and in each power supply period following the second power supply period T2.

5. The synchronous-motor starting method set forth in claim 4 above, wherein the synchronous-motor starting method is characterized in that until the required motor speed has been exceeded, the inverter output voltage in each power supply period following said second power supply period T2 is increased.

6. The synchronous-motor starting method set forth in claim 4 above, wherein the synchronous-motor starting method is characterized in that said inverter output voltage is controlled to ensure that when the required load torque is exceeded, the value of the current flowing into the motor will be increased and that when the required load torque is not exceeded, the value of the current flowing into the motor will be reduced.

7. The synchronous-motor starting method set forth in claim 4 above, wherein the synchronous-motor starting method is characterized in that the rotational speed and rotor position of the motor are estimated from the angular acceleration thereof and in that the inverter output voltage is controlled in each power supply period.

8. A synchronous-motor control apparatus equipped with an inverter which has a direct-current power supply and a power output means for supplying stator coils of multiple phases with power based on a direct-current voltage, and is designed to change power supply phases and drive a synchronous motor,
wherein the synchronous-motor control apparatus is characterized in that said inverter has an inverter circuit, a control circuit, a driver unit for driving said inverter circuit, and a rotor information detection unit, in that said control circuit comprises a starting unit, a power supply phase setting unit, a selection unit, a speed control unit, and a driving signal generating unit, in that the power supply phase signal transmitted from said starting unit to said power supply phase setting unit includes a first power supply pattern, a second power supply pattern, and a third power supply pattern, as three successive startup power supply patterns for said synchronous motor, and in that when the power supply period corresponding to said first power supply pattern, the power supply period corresponding to said second power supply pattern, and the power supply period corresponding to said third power supply pattern are taken as T1, T2, and T3, respectively, these periods are maintained in the relationship of $T1>T3 \geq T2 \geq 0$.

9. An air conditioner characterized in that it uses either a compressor or blower driven by a synchronous motor whose operation is controlled by the control apparatus set forth in claim 8 above.

10. A refrigerator characterized in that it uses a compressor driven by a synchronous motor whose operation is controlled by the control apparatus set forth in claim 8 above.

11. A washing machine characterized in that it is driven by a synchronous motor whose operation is controlled by the control apparatus set forth in claim 8 above.

12. A vacuum cleaner characterized in that it is driven by a synchronous motor whose operation is controlled by the control apparatus set forth in claim 8 above.

* * * * *